United States Patent Office 3,517,030
Patented June 23, 1970

3,517,030
OXETYL TOSYLATES AND HALOOXETANES
Sheldon L. Clark, Murray Hill, N.J., and Roger J. Polak, Mount Carmel, and John A. Wojtowicz, East Haven, Conn., assignors to Olin Mathieson Chemical Corporation, a corporation of Virginia
No Drawing. Filed June 14, 1966, Ser. No. 557,376
Int. Cl. C07d 3/00
U.S. Cl. 260—333    5 Claims

ABSTRACT OF THE DISCLOSURE

Oxetyl tosylates prepared by reacting a hydroxyoxetane and tosyl chloride are subsequently reacted with an alkali metal halide to yield the corresponding halooxetane. Polymers can be prepared from the halooxetanes by copolymerization with butadiene monoxide.

This invention relates to halooxetanes and to a method for their preparation. More particularly, in this invention an oxetyl tosylate is prepared by reaction of a hydroxyoxetane and tosyl chloride and, in a second step, the oxetyl tosylate is further reacted with an alkali metal halide to yield the corresponding halooxetane.

Preparation of oxetyl tosylates

In the first step of this invention a hydroxyoxetane of the formula:

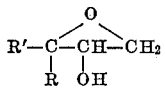

wherein R and R' are each selected from the group consisting of hydrogen and alkyl of from 1 to 5 inclusive carbon atoms, with tosyl chloride (i.e., p-toluenesulfonyl chloride) to yield the corresponding oxetyl tosylate of the formula:

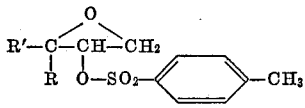

wherein R and R' have the same meaning as previously described. Preferably, the reaction is carried out in the presence of water and preferably, an acid acceptor is employed.

Useful hydroxyoxetanes include 3-hydroxyoxetane, 2-methyl-3-hydroxyoxetane, 2,2-dimethyl-3-hydroxyoxetane, 2-ethyl-2-n-propyl - 3 - hydroxyoxetane, 2-isobutyl-3-hydroxyoxetane, 2-n-propyl-2-amyl-3-hydroxyoxetane, etc. Hydroxyoxetanes can be prepared in the manner described in Ardis and Wojtowicz application Ser. No. 557,377, filed June 14, 1966 and now U.S. Pat No. 3,-446,819 issued May 27, 1969. For example, 3-hydroxyoxetane can be prepared by reacting propenoxyoxetane with chloride at 10° C. in a water-acetone mixture and in the presence of calcium carbonate.

Generally, stoichiometric quantities of the reactatnts are employed although in order to increase the yield, an excess of the tosyl chloride in an amount of up to 200 percent or more of the stoichiometric requirement can be employed. The reaction temperature can be varied widely and usually will be maintained at about 25 to 85° C. Materials which can be employed as acid acceptors includes, for example, sodium hydroxide, calcium hydroxide, lithium hydroxide, sodium carbonate, calcium carbonate, etc. Usually the stoichiometric requirement of the acid acceptor will be utilized although an excess of up to 10 percent or more can be employed, if desired. The tosylate product, which separates from the reaction mixture as a solid, can be recovered by filtration or by any other convenient method and can be further purified by recrystallization from, for example, benzene, toluene, hexane, petroleum ether or carbon tetrachloride.

Preparation of halooxetanes

Reaction of the oxetyl tosylates with an alkali metal halide yields the corresponding halooxetane having the formula:

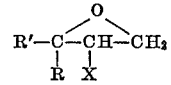

wherein R and R' are each selected from the group consisting of hydrogen and alkyl of from 1 to 5 carbon inclusive and X is chlorine, bromine, iodine or fluorine.

The quantities of the reactants employed can be varied over a wide range and generally will be from about 1 to about 10 moles or more of the alkali metal halide per mole of the oxetyl tosylate charged to the reactor. In a like manner, the temperature range over which this reaction can be conducted may be varied widely and usually will be between about 150 to about 250° C. and preferably from about 160 to 190° C.

Advantageously, the reaction is conducted in the presence of an inert organic solvent which can be, for example, a polyalkylene glycol such as diethylene glycol, triethylene glycol, tetraethylene glycol, polypropylene glycol such as polypropylene glycol of 1200 molecular weight, etc. Alkali metal halides useful in this process include lithium chloride, lithium bromide, lithium fluoride, lithium iodide and the corresponding potassium and sodium derivatives.

The reaction can be operated at atmospheric pressure; however, if desired, pressures varying from about 0.1 atmosphere up to about +5 atmospheres or more can be employed. Recovery of the product can be accomplished in a variety of ways well known in the art such as by extraction or by distilling the product from the reaction mixture, either continuously, or at the end of the reaction period.

Useful oxetyl tosylates includes compounds of the formula:

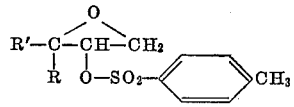

wherein R and R' are each selected from the group consisting of hydrogen and alkyl of from 1 to 5 inclusive carbon atoms. Suitable starting materials include 2-methyl-oxetyl-3-tosylate, 2,2 - dimethyloxyetyl-3-tosylate, 2-isopropyl-2-butyloxetyl - 3 - tosylate, 2,2 - diamyloxetyl-3-tosylate, etc.

EXAMPLE I

Preparation of oxetyl tosylate

Hydroxyoxetane (152 g., 2.06 moles), tosyl chloride (400 g., 2.10 moles) and 400 cc. water were charged to a two liter, three-neck, round bottom flask fitted with stirrer, thermometer and addition funnel. A 20 percent sodium hydroxide solution (86 g. NaOH in 350 cc. H₂O) was added dropwise so as to maintain a reaction temperature of 50 to 55° C. After addition of the sodium hydroxide, the reaction mixture was maintained at a temperature of 55 to 60° C. for 30 minutes and at the end of this period the reaction mixture was neutral to phenolphthalein. On cooling to room temperature, oxetyl tosylate separated from the reaction mixture as a white solid. The solid was dissolved in three liters of benzene and the aqueous layer extracted three times with 250 cc. portions of benzene. Then the combined benzene extract was washer with 100 cc. of concentrated ammonium hydroxide to remove any unreacted tosyl chloride. In the next step, the extract was washed four times with 100 cc. portions of water to remove traces of ammonium hydroxide following which the benzene extract was dried and stripped under vacuum. The yield of dry oxetyl tosylate obtained was 437 g., 1.92 moles (93 percent). The crude tosylate product which had a melting of 85 to 87° C., was recrystallized from hexane yielding the pure oxetyl tosylate with a M.P. of 88.5–89.0° C.

Analysis.—Calc'd for $C_{10}H_{12}O_4S$ (percent): C, 52.62; H, 5.30; S, 14.05. Found (percent): C, 52.81; H, 5.28; S, 14.12.

which time the bath temperature increased to 200° C. Redistillation gave 116 g. of pure fluorooxetane of the formula:

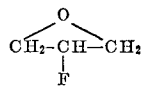

B.P. 68° C., $n_D^{28°}$ 1.3698, $d_4^{26}$ 1.109.

Analysis.—Calc'd for $C_3H_5OF$ (percent): C, 47.37; H, 6.63; F, 24.98. Found (percent): C, 47.25; H, 6.59; F, 25.15.

[A number of additional examples were conducted in the same manner as described in Example I. Pertinent details relating to these examples are presented below]

EXAMPLES II–IV

| Example | Hydroxy oxetane | | Tosylchloride | | Water, cc. | NaOH [1] | | Oxetyl tosylate | | Percent yield |
|---|---|---|---|---|---|---|---|---|---|---|
| | G. | Moles | G. | Moles | | G. | Moles | G. | Moles | |
| II | 0.80 | 0.0108 | 2.0 | 0.0105 | 2 | 0.42 | 0.0105 | 2.1 | 0.0092 | 85 |
| III | 10.04 | 0.135 | 27.6 | 0.145 | 20 | 6.3 | 0.157 | 29.6 | 0.130 | 96 |
| IV | 400.0 | 5.40 | 1,086 | 5.70 | 1050 | 240.0 | 6.00 | 1109 | 4.87 | 90 |

[1] Added as a 20 percent aqueous solution.

EXAMPLE V

Chlorooxetane

Oxetyl tosylate (372 g. 1.63 moles), triethylene glycol (375 cc.) and lithium chloride (75 g. 1.81 moles) were charged into a three-neck, round bottom flask fitted with stirrer, thermometer, distillation head and receiver (cooled with Dry Ice). The reaction mixture was heated in an oil bath at about 200 mm. pressure. Reaction commenced at about 160 to 170° C. A total of 116 g. of distillate was obtained over a 2.5 hour period during which time the reaction temperature was slowly raised to 200° C. Chromatographic analysis indicated the purity of the chlorooxetane product to be in excess of 95 percent. Redistillation through a 35 cm. packed column gave 113 g. of chlorooxetane, of the formula:

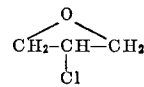

a colorless liquid, B.P. 104° C., $n_D^{20}$ 1.4409, $d_4^{25}$ 1.197.

Analysis.—Calc'd for $C_3H_5OCl$ (percent): C, 38.94; H, 5.45; Cl, 38.32. Found (percent): C, 39.47; H, 5.60; Cl, 38.2.

Infrared and nuclear magnetic resonance analysis substantiated the proposed structure.

EXAMPLE VI

Fluorooxetane

Oxetyl tosylate (456 g., 2.0 moles), potassium fluoride (465 g., 8.0 moles) and 450 cc. triethylene glycol were charged to the reactor (described under preparation of chlorooxetane in Example V). The reaction mixture was heated in oil bath and at about 160 to 170° C. (100 mm. pressure) the reaction commenced. A total of 126 g. of distillate was obtained over a 2.5 hour period during

EXAMPLE VII

Iodooxetane

Oxetyl tosylate (279 g., 1.22 moles), potassium iodide (220 g., 1.32 moles) and 400 cc. triethylene glycol were charged into the reactor employed in Example V. Heating of the reaction mixture in an oil bath was commenced and iodooxetane began to distill at a bath temperature of 175° C. at 55 to 60 mm. pressure. During the course of 2.5 hours, 191 g. of pale yellow distillate was obtained and the bath temperature had risen to 190° C. Redistillation gave 162 g. of pure iodooxethane of the formula:

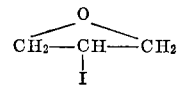

B.P.$_{.46}$ 78°, $n_D^{20°}$ 1.5625 and $d_4^{28}$ 2.089.

Analysis.—Calc'd for $C_3H_5OI$ (percent): C, 19.59; H, 2.74; I, 68.98. Found (percent): C, 19.73; H, 2.76; I, 68.8.

EXAMPLES VIII–XIII

[A number of additional examples were carried out in the same manner as described in Example V. Pertinent data relating to these experiments is presented below]

| Example | Oxetyl-tosylate | | Triethylene glycol, cc. | Alkali halide | | Halo-oxetane | | Percent yield |
|---|---|---|---|---|---|---|---|---|
| | G. | Moles | | G. | Moles | G. | Moles | |
| | | | | Chlorooxetane | | | | |
| VIII | 1.9 | 0.0083 | 2.0 | [1] 0.50 | 0.012 | 0.6 | 0.0065 | 76 |
| IX | 13.0 | 0.057 | 15 | 3.5 | 0.083 | 3.5 | 0.038 | 67 |
| X | 325 | 1.43 | 400 | 110 | 2.59 | 66.0 | 0.713 | 50 |
| | | | | Fluorooxetane | | | | |
| XI | 7.0 | 0.031 | | [2] 5.0 | 0.086 | 1.5 | 0.020 | 65 |
| XII | 7.0 | 0.031 | 10 | 9.0 | 0.155 | 2.0 | 0.026 | 84 |
| XIII | 102.5 | 0.45 | 98 | 106 | 1.83 | 26.7 | 0.35 | 78 |

[1] LiCl. [2] KF.

The novel halooxetanes prepared by the process of this invention can be utilized to prepare valuable sulfur-vulcanizable polyether copolymers by copolymerizing a mixture of the halooxetane and an oxirane monomer with a catalyst formed by reacting an organo aluminum compound, such as triethyl aluminum, with from about 0.01 mole to about 2 moles of a chelating agent, such as acetylacetone, trifluoroacetylacetone, ethoxyacetic acid, etc. and with from about 0.1 mole to about 1.5 moles of water per mole of the organoaluminum compound. A typical catalyst for such a polymerization is the product obtained by reacting 1 mole of triethyl aluminum with 1 mole of acetylacetone and with 0.5 mole of water.

Specifically, a valuable copolymer can be prepared by charging a polymerization vessel, in which air has been replaced with nitrogen, with 150 parts of n-heptane, 25 parts of chloro-3-oxetane and about 0.60 part of butadiene monoxide dissolved in 1.1 parts of n-heptane and the vessel and contents adjusted to a temperature of 65° C. A 65° C., a chelated reaction product made from 1 mole of triethyl aluminum—0.5 mole of water, 1 mole of acetylacetone dissolved in n-heptane and diethyl ether and equivalent to 2.5 parts of triethyl aluminum, is added as catalyst and the reaction mixture agitated for about 10 hours at about 65° C., stored for about 15 hours at room temperature and again agitated for 5 more hours at 65° C. making a total of 30 hours reaction time. During this reaction period additional quantities of butadiene monoxide are added in about 5 increments the total amount added being 2.20 parts of butadiene monoxide dissolved in n-heptane. At the conclusion of the reaction, the polymerization was stopped by adding 5 parts of anhydrous ethanol for each 10 parts of monomers employed. Finally, the reaction mixture was diluted with about 4 volumes of n-heptane and the insoluble polymer was collected, washed and dried giving a tough, snappy, rubber in an amount equal to a yield of about 85 percent based on the mixture of monomers employed. Additional details concerning the preparation of oxetaneoxirane copolymers of this type can be found in U.S. 3,205,207.

What is claimed is:

1. A compound of the formula:

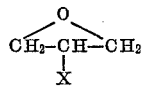

wherein X is a halogen selected from the group consisting of chlorine, bromine, iodine and fluorine.

2. 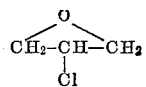

3. 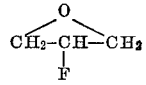

4. 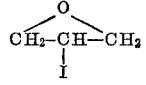

5. A compound of the formula:

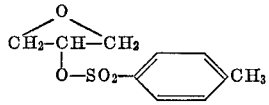

References Cited

Chemical Abstracts, vol. 60. Subject Index, January-June 1964, pp. 2124–5S.

Houben-Weyl, Methoden der Organischen Chemie, vol. V/4, 1960, 4th ed., pp. 408–9.

Morrison et al., Organic Chemistry, October 1962, pp. 507–509.

Fieser et al., Organic Chemistry, 2nd. ed., p. 628.

NORMA S. MILESTONE, Primary Examiner

U.S. Cl.X.R.
260—88.3